United States Patent
Yamakoshi

[11] Patent Number: 5,984,428
[45] Date of Patent: Nov. 16, 1999

[54] BRAKE FLUID PRESSURE CONTROL VALVE

[75] Inventor: Mutsuro Yamakoshi, Higashimatsuyama, Japan

[73] Assignee: Jidosha Kiki Co., Ltd., Tokyo, Japan

[21] Appl. No.: 08/994,477

[22] Filed: Dec. 19, 1997

[30] Foreign Application Priority Data

Dec. 25, 1996 [JP] Japan .................................. 8-344382

[51] Int. Cl.⁶ .................................................. B60T 8/18
[52] U.S. Cl. ........................ 303/22.8; 303/9.61; 188/352
[58] Field of Search .......................... 188/352; 303/9.75, 303/22.7, 22.8, 9.61, 9.63, 9.71, 9.69, 22.1, 22.4; 137/505.18; 251/336

[56] References Cited

U.S. PATENT DOCUMENTS

| | | | |
|---|---|---|---|
| 3,650,572 | 3/1972 | McClure et al. | 303/22.8 |
| 4,750,791 | 6/1988 | Schonlau et al. | 303/22.8 |
| 5,082,332 | 1/1992 | Tribuzio et al. | 303/9.73 |
| 5,299,600 | 4/1994 | Aronovich | 137/626.65 |
| 5,451,098 | 9/1995 | Pressaco et al. | 303/9.69 |
| 5,560,689 | 10/1996 | Yamakoshi et al. | 303/22.8 |

FOREIGN PATENT DOCUMENTS 6-11263  3/1994  Japan .

*Primary Examiner*—Robert J. Oberleitner
*Assistant Examiner*—Pamela J. Lipka
*Attorney, Agent, or Firm*—Alston & Bird LLP

[57] ABSTRACT

The present invention provides a brake fluid pressure control valve having a plunger 23 slidably fitted in a cylinder hole 22 in a cylinder housing 21 and a retainer 24 which holds the posture of the plunger 23 and seals one end of the cylinder hole 22 by using an O-ring 31 serving as a sealing member, the control valve being characterized in that the plunger 23 is formed with a step 27a, the cylinder housing 21 is provided with an engagement hole 29, which engages with the step 27a and is formed in the direction crossing with respect to the plunger 23, and a pin 30 is inserted in the engagement hole 29 so that the plunger 23 is prevented from coming off by the pin 30. Further, the engagement hole 29 is also used as an air bleeding path adjacent to an installation hole for an air bleeder 40.

3 Claims, 4 Drawing Sheets

BRAKE FLUID PRESSURE CONTROL VALVE

FIELD OF THE INVENTION AND RELATED ART STATEMENT

The present invention relates to a brake fluid pressure control valve for controlling a brake fluid pressure according to a movable load of a vehicle.

FIG. 5 is a schematic diagram of a brake system using a brake fluid pressure control valve. When a pedal 1 is depressed, the fluid supplied from a master cylinder is separately discharged from fluid pressure chambers 3a and 3b. The fluid in the fluid pressure chamber 3a is introduced to a front wheel driving cylinder through a front-wheel-side pipe 4a. The fluid in the fluid pressure chamber 3b passes through a rear-wheel-side pipe 5 and enters a brake fluid pressure control valve 6, where the fluid pressure is regulated according to the movable load of the vehicle, and then the fluid is introduced to a rear wheel driving cylinder through an output pipe 7. The fluid pressure chamber 3a is also connected to the brake fluid pressure control valve 6 via a pipe 4b.

FIG. 6 is a longitudinal sectional view of a conventional brake fluid pressure control valve. This brake fluid pressure control valve 6 includes a plunger 10 integrally having a fluid pressure control valve element, which is contained in a valve housing 8, for regulating a brake fluid pressure and a pressing member 12, which constitutes a load detection mechanism 11, for opening the fluid pressure control valve element 9 by pressing the plunger 10. The plunger 10 is sealed by a sealing member 13 and a retainer 14. The retainer is prevented from coming off by a snap ring 15a.

OBJECT AND SUMMARY OF THE INVENTION

The aforementioned brake fluid pressure control valve 6 has a fail-safe structure by which the rear-wheel-side brake action is released and the ordinary brake action is accomplished when the front-wheel-side pipe 4a or 4b is broken. In the event that the snap ring 15a for preventing the retainer 14 from coming off gets out of place, the sealing member 13 is pushed up to the outside and dislocated by the pressure in the rear-wheel-side fluid chamber 16, so that the seal becomes incomplete and the fluid leaks to the outside. As a result, there is a possibility that the brake action cannot be ensured. A snap ring 15b different from the snap ring 15a is provided as measures against this problem. For this purpose, however, a groove must be formed along the inner periphery of the valve housing 8. This construction has a disadvantage that the grooving operation is difficult to perform and the construction becomes complicated. Also, another construction has been known in which the retainer 14 is screwed in place of the snap ring 15a. This construction has a disadvantage that the threading operation is needed, and the construction becomes complicated, so that the costs of fabrication, assembly, etc. are high.

The present invention was made to solve the problems with the aforementioned prior art, and an object thereof is to provide a brake fluid pressure control valve in which the brake action can be ensured even if the snap ring gets out of place, the construction is simple, and the cost can be kept low.

To achieve the above object, the present invention provides a brake fluid pressure control valve for controlling a fluid pressure supplied from a master cylinder, having a plunger slidably fitted in a cylinder hole in a cylinder housing and a retainer which holds the posture of the plunger and seals one end of the cylinder hole by using a sealing member, the control valve being characterized in that the plunger is formed with a step, the cylinder housing is provided with an engagement hole, which engages with the step and is formed in the direction crossing with respect to the plunger, and a pin is inserted in the engagement hole so that the plunger is prevented from coming off by the pin.

According to the present invention, in a brake fluid pressure control valve for controlling a fluid pressure supplied from a master cylinder, having a plunger slidably fitted in a cylinder hole in a cylinder housing and a retainer which holds the posture of the plunger and seals one end of the cylinder hole by using a sealing member, the plunger is formed with a step, the cylinder housing is provided with an engagement hole, which engages with the step and is formed in the direction crossing with respect to the plunger, and a pin is inserted in the engagement hole so that the plunger is prevented from coming off by the pin. Therefore, even if the member for preventing the retainer from coming off is missing, the function of the front wheel brake system can be secured, the construction is simple, and the cost can be kept low. Further, since the engagement hole is also used as an air bleeding path adjacent to an installation hole for an air bleeder, the construction is simple, and the assembly is easy, so that the control valve is more economical.

DETAILED DESCRIPTION OF PREFERRED EMBODIMENTS

Figure 1:
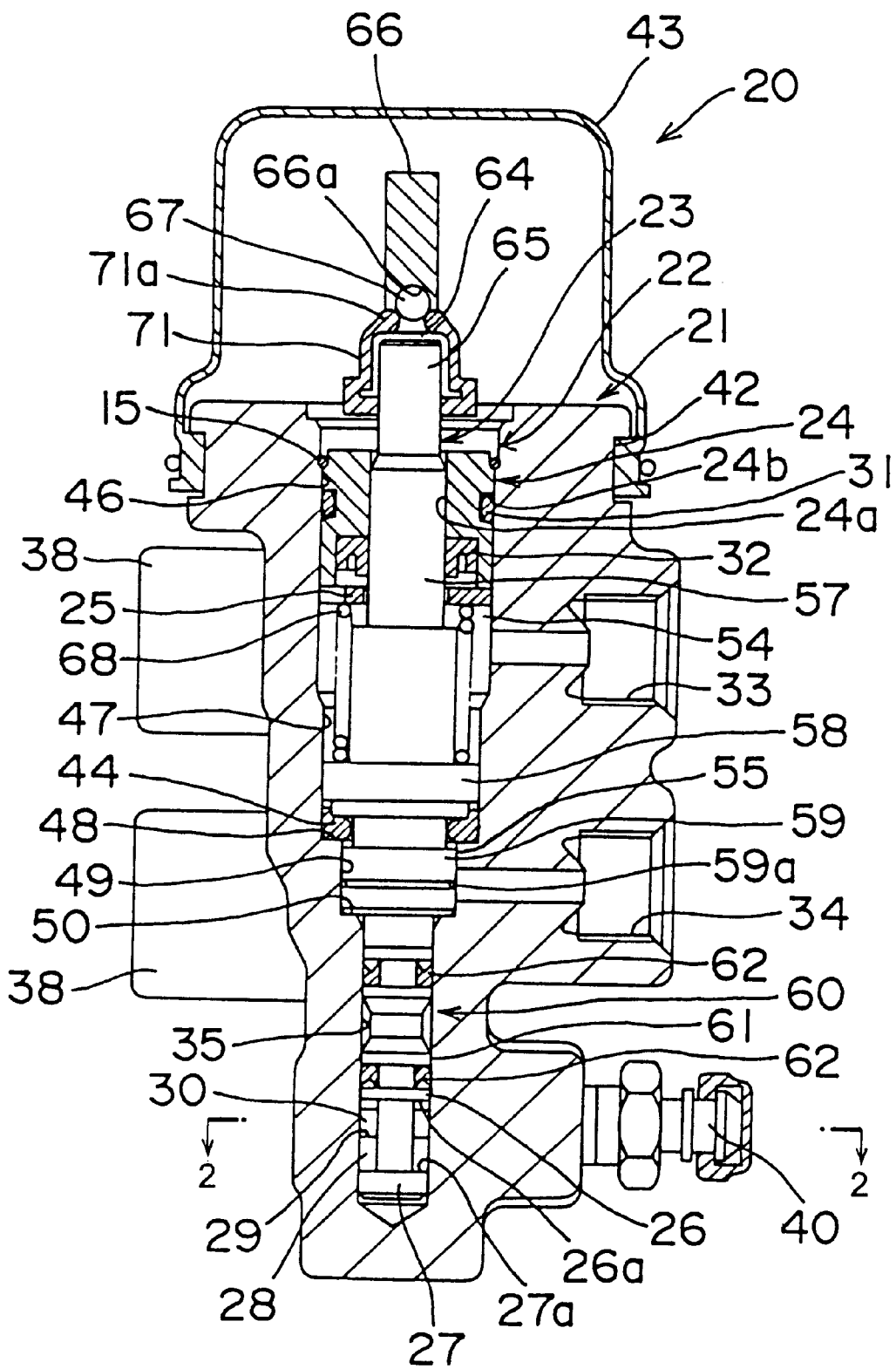
FIG. 1 is a longitudinal sectional view of a brake fluid pressure control valve in accordance with an embodiment of the present invention.
Figure 2:
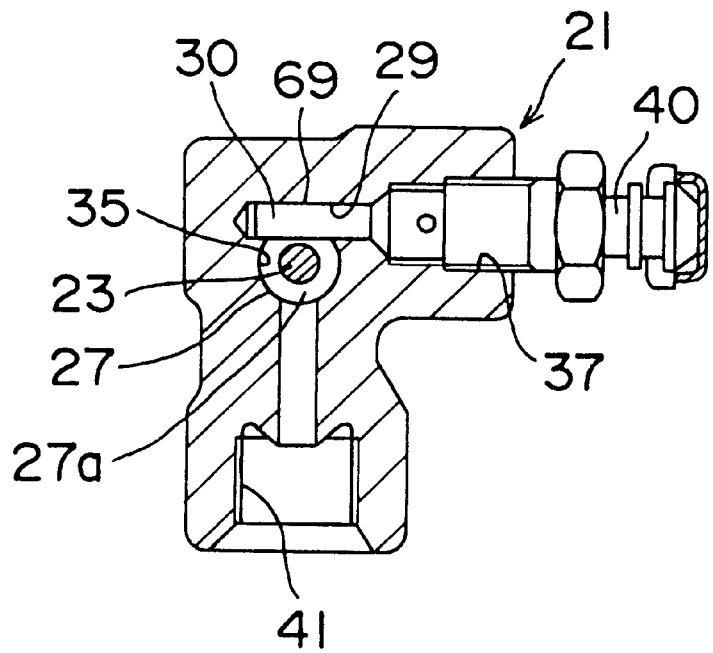
FIG. 2 is a sectional view taken along the line A—A of FIG. 1.

Embodiments of the present invention will be described in detail with reference to the accompanying drawings. FIG. 1 is a longitudinal sectional view of a brake fluid pressure control valve in accordance with an embodiment of the present invention, and FIG. 2 is a sectional view taken along the line A—A of FIG. 1. The brake fluid pressure control valve 20 of this embodiment has a plunger 23 slidably fitted in a cylinder hole 22 in a cylinder housing 21 and a retainer 24 which holds the posture of the plunger 23 and seals one end of the cylinder hole 22 by using an O-ring 31 serving as a sealing member.

In this brake fluid pressure control valve 20, the plunger 23 is formed with step portions 26a and 27a by flanges 26 and 27 at the lower part in FIG. 1. The cylinder housing 21 is provided with an engagement hole 29 which engages with the step portions 26a and 27a and extends in the direction crossing with respect to the plunger 23. A pin 30 is inserted in the engagement hole 29, and the plunger 23 is prevented from coming off by the pin 30 with which the flange 27 comes into contact.

Figure 5:
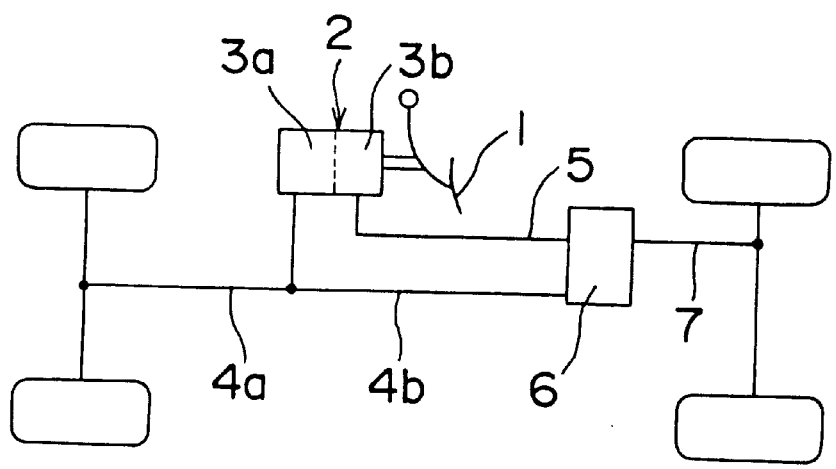
FIG. 5 is a schematic diagram of a brake system using a brake fluid pressure control valve.

The cylinder housing 21 has an input port 33 and an output port 34 at the side in FIG. 1. It also has a small-diameter hole 35 on the extension of the cylinder hole 22 in which the plunger 23 fits slidably, the engagement hole 29 in the direction perpendicular to the small-diameter hole 35 as shown in FIG. 2, and an installation hole 37 adjacent to the engagement hole 29. An air bleeder 40 for bleeding air is threadedly mounted into the installation hole 37, and another input port 41, which is disposed in the direction perpendicular to both of the small-diameter hole 35 and the engagement hole 29 and communicates with these holes, is provided at the lower part. This input port 41 communicates with a master cylinder and a front-wheel-side brake cylinder through a pipe similar to the pipe 4b shown in FIG. 5.

Referring to FIG. 1, the cylinder housing 21 is formed with an annular groove 42 at the upper part thereof, and the upper end thereof is covered with a boot 43 whose lower end is fitted in the annular groove 42. The cylinder hole 22 has a fitting hole 46 for fitting the retainer 24, a guide hole 47 adjacent to the fitting hole 46, a guide hole 49 having a reduced diameter, which is formed adjacently to the guide hole 47 with a step face 48 being interposed, and the small-diameter hole 35 having a reduced diameter, which is formed adjacently to the guide hole 49 with a step face 50 being interposed. The cylinder hole 22 is formed with an input pressure chamber 54 communicating with the input port 33 and an output pressure chamber 55 communicating with the output port 34, and a seat member 44 is fitted so as to be in contact with the step face 48.

The cylinder housing 21, having fixing portions 38 protruding at two places, is fixed to the chassis side of a vehicle with bolts screwed in threaded holes (not shown) formed in the fixing portions 38.

The plunger 23 has a small-diameter portion 57 guided by a center hole 24a of the retainer 24, a large-diameter guide receiving portion 58 guided by the guide hole 47, a valve element 59, and a small-diameter fail-safe section 60. The flanges 26 and 27 are provided on the tip end side and at the intermediate position of the fail-safe section 60, and the annular step portion 27a formed on the flange 27 on the tip end side faces the pin 30, so that the plunger 23 is prevented from coming off by the pin 30. The outside diameter of the pin 30 is set so as to be smaller than the engagement hole 29, so that a clearance is present between the outer periphery of the pin 30 and the inner periphery of the engagement hole 29, whereby an air bleeding flow path 69 is secured as shown in FIG. 2.

The plunger 23 has an annular groove 59a in order to provide good running of fluid along the outer periphery of the valve element 59. Taking the cross-sectional area of the valve element 59 at a portion other than the annular groove 59a as $S_1$, the cross-sectional area of the small-diameter portion 57 as $S_2$, and the cross-sectional area of a pressure receiving portion 61 of the fail-safe section 60 as $S_3$, the dimensions are set so that an inequality $S_1 - S_2 > S_3$ holds.

Also, the plunger 23 has a pressing force receiving portion 65, which is covered with a cap 64, at one end protruding from the cylinder housing 21. The pressing force receiving portion 65 is disposed so as to face a pressing spherical body 67 fitted in a pressing member 66. The plunger 23 is urged in the valve opening direction by a compression spring 68 disposed between a spring receiving member 25 and the guide receiving portion 58. When the valve element 59 comes into contact with the seat member 44 against the urging force of the compression spring 68, the valve is closed, while when the pressing force receiving portion 65 is pressed by the pressing spherical body 67 and the valve element 59 separates from the seat member 44, the valve is opened. In the case where the valve is open, even if the guide receiving portion 58 comes into contact with the seat member 44, a path (not shown) is secured, so that the input port 33 and the output port 34 communicate with each other.

The fail-safe section 60 of the plunger 23 has the hand drum shaped pressure receiving portion 61 above the flanges 26 and 27. Annular sealing members 62, 62 are disposed at both sides of the pressure receiving portion 61, and a chamber 28 between the flanges 26 and 27 communicates with the master cylinder, which is similar to the master cylinder 2 shown in FIG. 5, and the front-wheel-side brake cylinder through the input port 41. This construction is provided to transmit a sufficient braking force to the rear wheel brake system if a trouble occurs, for example, if the front wheel brake system malfunctions because of oil leakage in the front wheel brake system of master cylinder.

Specifically, the fluid pressure of the front wheel brake system of the front and rear wheel brake systems of the master cylinder is applied to the input port 41, so that, when the fluid pressure of the front wheel is decreased by oil leakage, the valve closing by the pushing-back action of the plunger 23 is delayed by the loss of fluid pressure applied to the fail-safe section 60 to increase the fluid pressure, by which a higher output fluid pressure than the ordinary fluid pressure is delivered to the brake cylinder for the rear wheel. Therefore, even if the front wheel brake does not operate, a sufficient braking force can be given to the vehicle.

The retainer 24 guides the plunger 23 in the center hole 24a while slidably holding the posture of the plunger 23. The retainer 24 is fixed at a predetermined position in the fitting hole 46 in a state such that the outer and inner peripheries thereof are sealed by the O-ring 31, which is an annular sealing member fitted in an outer peripheral groove 24b, and an annular sealing member 32 along the outer periphery of the small-diameter portion 57 of the plunger 23, respectively, and receives one end of the compression spring 68 via the spring receiving portion 25.

Figure 6:
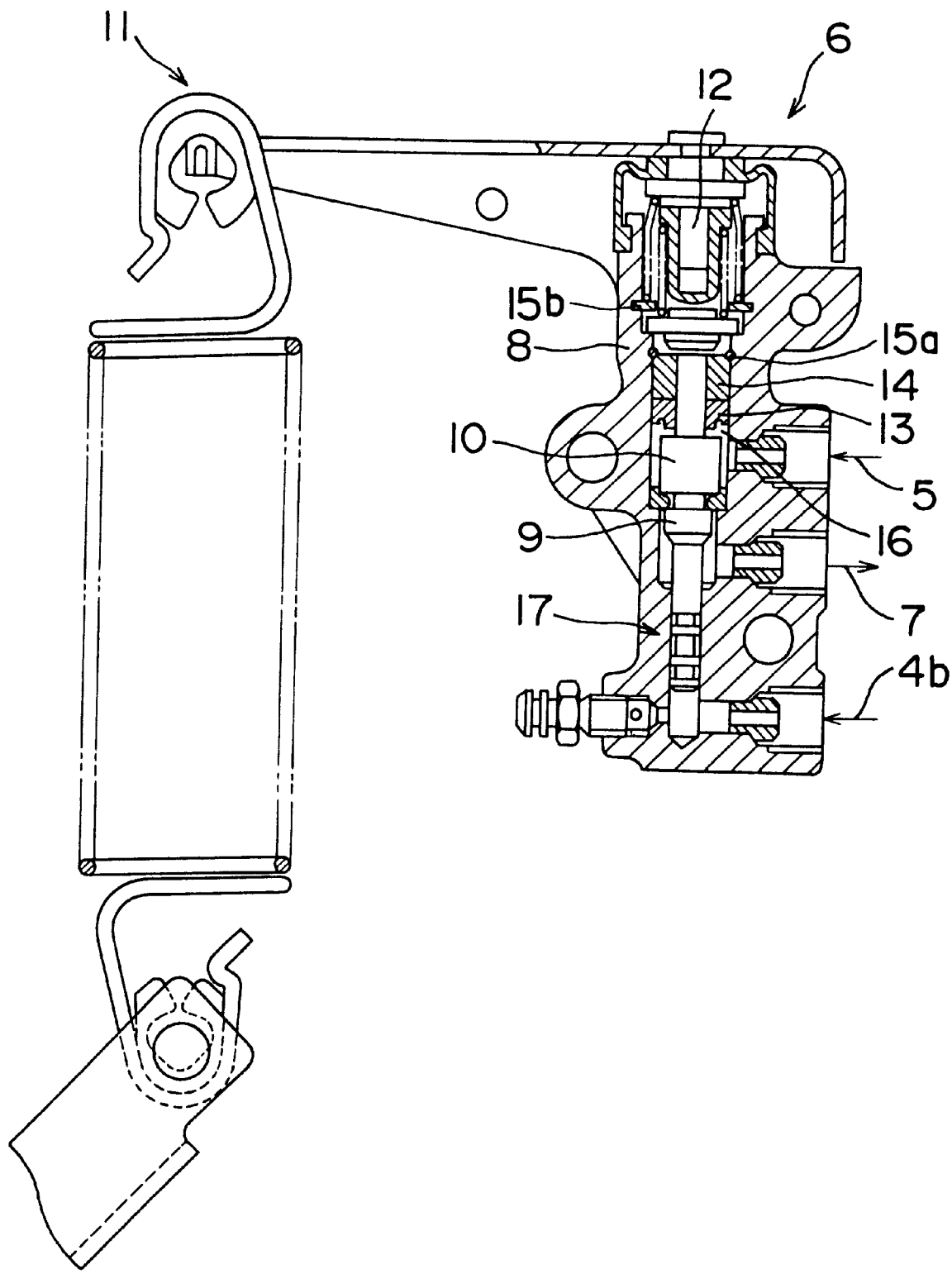
FIG. 6 is a longitudinal sectional view of a conventional brake fluid pressure control valve.

The pressing member 66 is fixed to a lever (not shown) constituting a mechanism similar to the load detection mechanism 11 shown in FIG. 6, and the pressing spherical body 67 is pressed into a spherical hole 66a formed in a portion facing the pressing force receiving portion 65 of the plunger 23. The pressing spherical body 67 is arranged concentrically at a hole edge 71a of an elastic member 71 disposed at the end of the cylinder housing 21, so that, when the aforesaid lever is displaced according to the movable load of the vehicle, the pressing spherical body 67 goes into the elastic member 71 by spreading out the hole edge 71a to press the pressing force receiving portion 65 of the plunger 23.

The following is a description of the operation of the brake fluid pressure control valve in accordance with the above embodiment. When the pressing member 66 presses and moves the plunger 23 by a pressing force transmitted from the load detection mechanism, the valve element 59 separates from the seat member 44 so that the valve is opened. In this state, the fluid pressure from the master cylinder enters the input pressure chamber 54 through the input port 33, reaching the output port 34 from the output pressure chamber 55 through a clearance between the valve element 59 and the seat member 44, and then the fluid pressure is sent to the rear wheel brake cylinder through the output port 34. The fluid pressure in the brake cylinder is increased, and when the resultant force of the force acting on the valve element 59 based on the increased fluid pressure and the force acting on the fail-safe section 60 exceeds the aforesaid pressing force, the urging force of the compression spring 68, etc., the plunger 23 is pushed back toward the pressing member 66, so that the valve element 59 comes into contact with the seat member 44, whereby the valve is closed.

Figure 3:
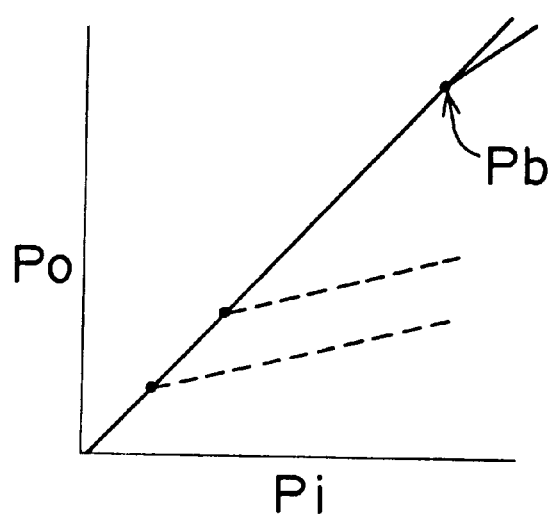
FIG. 3 is a graph showing the relationship between input fluid pressure and output fluid pressure, showing the characteristics of a brake fluid pressure control valve in accordance with an embodiment of the present invention.

When the rear wheel brake system and the snap ring 15 are normal, and the fluid pressure in the front wheel brake system is abnormally decreased by oil leakage etc., the valve closing by the pushing-back action of the plunger 23 is delayed by the loss of fluid pressure applied to the fail-safe section 60. Therefore, as shown in FIG. 3, a bend point Pb of the output fluid pressure Po with respect to the input fluid pressure Pi of the rear wheel brake system, shown on the abscissa, is increased, so that a higher fluid output pressure Po than the ordinary fluid pressure is delivered to the rear wheel brake cylinder.

In the case of the above embodiment of the present invention, if the front wheel brake system is normal, the front wheel brake operates normally even if the snap ring 15 is missing. Also, even if the front wheel brake system is abnormal due to oil leakage etc., the rear wheel brake operates if the rear wheel brake system and the snap ring 15 are normal. In either case, the braking of the whole vehicle is ensured.

Figure 4:
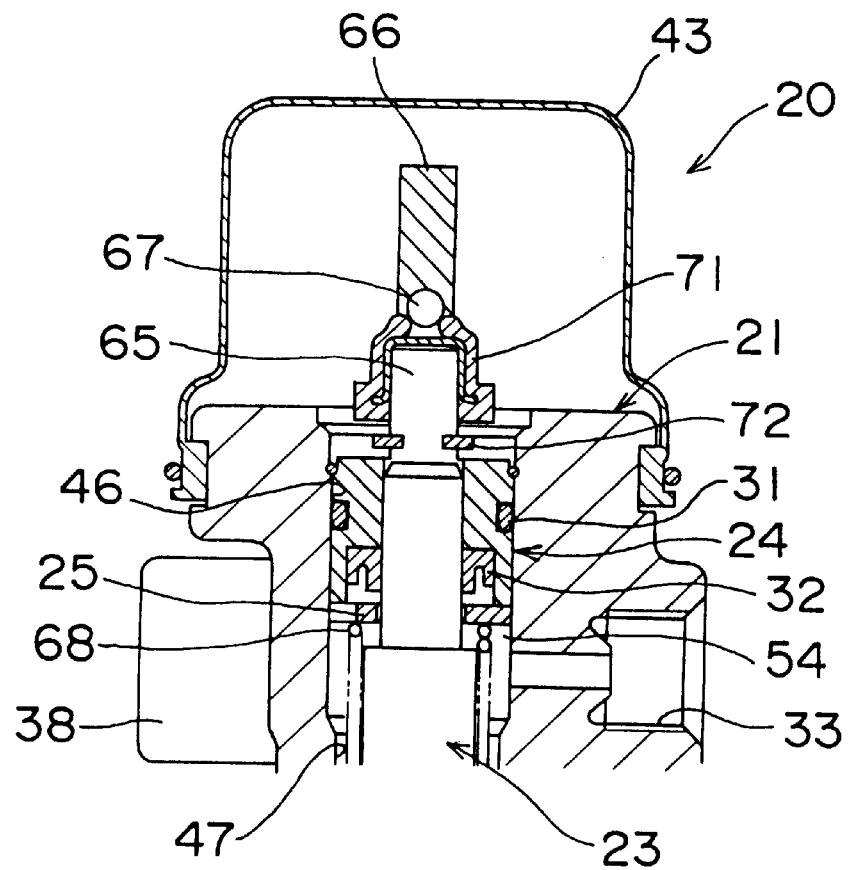
FIG. 4 is a longitudinal sectional view showing an essential part of a brake fluid pressure control valve in accordance with another embodiment of the present invention.

FIG. 4 is a longitudinal sectional view showing an essential part of a brake fluid pressure control valve in accordance with another embodiment of the present invention. For this brake fluid pressure control valve 20, an E-shaped snap ring 72 is positioned and mounted, as a member for preventing the retainer 24 from coming off, at a portion of the pressing force receiving portion 65 of the plunger 23 at a position between the retainer 24 and the elastic member 71. The retainer 24 is prevented from coming off by this snap ring 72. Since other configurations are the same as those of the aforementioned embodiment, the same reference numerals are applied to the same elements, and the duplicate explanation of these elements is omitted. With this configuration, even if the front wheel brake system is abnormal due to oil leakage etc. and a C-shaped snap ring 15 is missing, the rear wheel brake operates if the rear wheel brake system is normal. Also, if the front and rear wheel brake systems are normal, both of the front and rear wheel brakes operate even if the C-shaped snap ring 15 is missing.

The present invention is not limited to the above embodiments, and various modifications can be made without departing from the spirit and scope of the present invention. For example, the pin 30 may be formed integrally with the air bleeder 40, by which the number of necessary parts can be reduced and the assembly can be made efficiently.

I claim:

1. A brake fluid pressure control valve for controlling a fluid pressure supplied from a master cylinder, said control valve comprising:

a plunger slidably fitted in a cylinder hole in a cylinder housing, wherein said plunger slides along a path in said cylinder hole, and a retainer which holds the posture of said plunger and seals one end of said cylinder hole by using a sealing member, wherein said plunger is formed with a surface that extends transversely to said path, said cylinder housing is provided with an engagement hole which is formed around an axis that is transverse to said path and which defines an opening into said cylinder hole, at least a portion of said engagement hole extends into a portion of said cylinder housing exterior of said cylinder hole, and a pin is inserted in said portion of said engagement hole exterior of said cylinder hole and extends out of said opening of said engagement hole and into said path so that said plunger is prevented by interaction between said surface and said pin from being displaced excessively within said cylinder housing, whereby said plunger is prevented from being separated from said cylinder housing.

2. A break fluid pressure control valve for controlling a fluid pressure supplied from a master cylinder, said control valve comprising:

a plunger slidably fitted in a cylinder hole in a cylinder housing, wherein said plunger slides along a path in said cylinder hole, and a retainer which holds the posture of said plunger and seals one end of said cylinder hole by using a sealing member, wherein said plunger is formed with a surface that extends transversely to said path, said cylinder housing is provided with an engagement hole which is formed around an axis that is transverse to said path and which defines an opening into said cylinder hole, at least a portion of said engagement hole extends into said cylinder housing, and a pin is inserted in said engagement hole and extends out of said opening of said engagement hole and into said path so that said plunger is prevented by interaction between said surface and said pin from being displaced excessively within said cylinder housing, whereby said plunger is prevented from being separated from said cylinder housing, and wherein said engagement hole is also used as an air bleeding path adjacent to an installation hole for an air bleeder.

3. A brake fluid pressure control valve for controlling a fluid pressure supplied from a master cylinder, said control valve comprising:

a plunger slidably fitted in a cylinder hole in a cylinder housing, wherein said plunger slides along a path in said cylinder hole, and a retainer which holds the posture of said plunger and seals one end of said cylinder hole by using a sealing member, wherein said plunger is formed with a surface that extends transversely to said path, said cylinder housing is provided with an engagement hole which is formed around an axis that is transverse to said path and which defines an opening into said cylinder hole, at least a portion of said engagement hole extends into said cylinder housing, and a pin is inserted in said engagement hole and extends out of said opening of said engagement hole and into said path so that said plunger is prevented by interaction between said surface and said pin from being displaced excessively within said cylinder housing, whereby said plunger is prevented from being separated from said cylinder housing, and wherein said cylinder housing comprises a wall extending around and defining said cylinder hole, and said wall defines said engagement hole.

* * * * *